US007829022B1

(12) United States Patent
Lich

(10) Patent No.: US 7,829,022 B1
(45) Date of Patent: Nov. 9, 2010

(54) CENTRIFUGE TUBE ASSEMBLY AND METHOD OF USING THE SAME

(76) Inventor: Bryan V. Lich, 500 Keenan Ave., Fort Myers, FL (US) 33919

( * ) Notice: Subject to any disclaimer, the term of this patent is extended or adjusted under 35 U.S.C. 154(b) by 1378 days.

(21) Appl. No.: 11/167,706

(22) Filed: Jun. 27, 2005

(51) Int. Cl.
*G01N 9/30* (2006.01)

(52) U.S. Cl. ......................... 422/72; 422/102; 210/645; 73/864

(58) Field of Classification Search ................... 422/72, 422/102; 210/782; 494/16; 73/424
See application file for complete search history.

(56) References Cited

U.S. PATENT DOCUMENTS

| | | | | |
|---|---|---|---|---|
| 3,024,660 | A * | 3/1962 | Tothill | 73/863.83 |
| 4,060,000 | A * | 11/1977 | Baker et al. | 73/863.33 |
| 4,279,863 | A * | 7/1981 | Friehler | 422/102 |
| 6,544,162 | B1 | 4/2003 | Van Wie et al. | 494/37 |
| 6,592,507 | B2 | 7/2003 | Jorgensen et al. | 494/21 |
| 2002/0046614 | A1* | 4/2002 | Alley | 73/864.91 |
| 2002/0151423 | A1 | 10/2002 | Jorgensen et al. | 494/21 |
| 2002/0182664 | A1 | 12/2002 | Dolecek et al. | 435/40.5 |
| 2002/0185457 | A1 | 12/2002 | Smith et al. | 210/787 |
| 2003/0205538 | A1 | 11/2003 | Dorian et al. | 210/787 |
| 2004/0072668 | A1* | 4/2004 | Leung | 494/56 |

OTHER PUBLICATIONS

Hadi Saleh and Felicia Cox, "Gravitational platelet separation", British Journal of Perioperative Nursing, vol. 14, No. 4, Apr. 2004.

* cited by examiner

*Primary Examiner*—Vickie Kim
*Assistant Examiner*—David Weisz
(74) *Attorney, Agent, or Firm*—Dennis L. Thomte; Thomte Patent Law Office LLC

(57) ABSTRACT

A centrifuge tube assembly comprising an elongated vial having an open upper end and a closed lower end with a lid mounted on the upper end thereof. The lid has a central opening formed therein which rotatably receives an elongated inner tube extending downwardly into the vial with the bottom of the inner tube being received by an upstanding bottom tube. The lower end of the inner tube has a pair of vertically spaced-apart upper and lower ports. The bottom tube has a pair of upper and lower ports formed therein which are radially offset with respect to one another. A tube actuator is secured to the upper end of the inner tube to facilitate the rotation of the inner tube between first and second positions. When the inner tube is in its first position, the lower ports of the inner tube and bottom tube are in register. When the tube actuator is in its second position, the upper ports of the inner tube and the bottom tube are in register. The method of using the centrifuge tube assembly of the invention is also described.

23 Claims, 8 Drawing Sheets

CENTRIFUGE TUBE ASSEMBLY AND METHOD OF USING THE SAME

BACKGROUND OF THE INVENTION

1. Field of the Invention

This invention relates to an improved centrifuge tube assembly which allows for the induction or aspiration of fluids from two distinct levels within the centrifuge tube assembly. More particularly, the device may be used for the separation, isolation and extraction of discrete layers in a liquid suspension.

2. Description of the Related Art

Various medical procedures utilize platelet-rich blood plasma. The blood product is effective due to its growth promoting features, which are proven to assist greatly in wound and bone regeneration such as described in U.S. Published Application 2002/0185457 A1.

Although the device of the above-identified published application has apparently experienced some success, it is believed that the device of the application suffers from certain drawbacks or disadvantages. For example, the centrifuge tube assembly of the published patent application does not draw blood from the elongated tubular receptacle in a manner which is parallel to the layers of separation which detracts from the integrity of the layers and retards the speed of component aspiration. Further, the centrifuge tube assembly of the published application involves the use of two aspiration ports which increases the risk of accidental contamination. Additionally, the centrifuge tube assembly of the published application, by utilizing a pair of aspiration pipes 36 and 38, increases the cost of manufacture of the assembly. An additional drawback of the device of the publication application is that its aspiration pipes are not supported at their bases. This may lead to resonance and vibration during the centrifugation process that may disrupt the separation of the layers and prematurely activate the platelets.

SUMMARY OF THE INVENTION

A centrifuge tube assembly and the method of using the same is disclosed. The centrifuge tube assembly of this invention comprises an elongated vial having an open upper end and a closed lower end with the upper end of the vial being closed by a lid or cover which is snap-fitted onto the upper end of the vial. The lid is provided with a centrally disposed, hollow tubular portion which defines a central opening. The vial has a centrally disposed hollow bottom tube, having upper and lower ends, which extends upwardly from the lower end thereof. The hollow bottom tube has vertically spaced-apart upper and lower ports formed therein which are radially offset with respect to one another. The separator also includes an inner tube which has upper and lower ends. The inner tube is positioned within the vial so as to rotatably extend through the central opening in the lid with the lower end of the inner tube being rotatably received by the bottom tube. The inner tube has vertically spaced-apart upper and lower ports formed therein. The inner tube is selectively rotatable between first and second positions with respect to the bottom tube and the lid. A tube actuator is secured to the upper end of the inner tube so that the inner tube may be conveniently and selectively rotated with respect to the vial to its first and second positions. The tube actuator includes a centrally disposed, hollow tube member which is in communication with the upper end of the inner tube. When the inner tube is in its first position, the lower port of the inner tube registers with the lower port of the bottom tube. When the inner tube is in its first position, the upper ports of the bottom tube and the inner tube are not in register. When the inner tube is in its second position, the upper port of the inner tube is in register with the upper port of the bottom tube. When the inner tube is in its second position, the lower port of the inner tube is not in register with the lower port of the bottom tube.

The method of using the centrifuge tube assembly is also disclosed. The method comprises the following steps. A 60 cc syringe is filled with 5 ml of CPDA. 50 ml of blood is then drawn into the syringe. The syringe is then gently agitated to mix the blood and the CPDA. The tube actuator or the vial is then rotated to its first position. 50 ml of blood is then introduced into the vial through the open upper end of the tubular member of the tube actuator and the upper end of the inner tube. The vial is placed in a centrifuge and spun at 3300 rpm for approximately eight minutes. The vial is then removed from the centrifuge. With the tube actuator in its first position, the technician subtracts three from the RBC/plasma interface level and draws the calculated amount of red blood cells from the inner tube through the upper end thereof. In position one, the lower ports of the bottom tube and the inner tube are in register so that the red blood cells in the vial may be drawn into the inner tube. The vial is then placed in the centrifuge and spun at 3300 rpm for eight minutes. The vial is then removed from the centrifuge. The tube actuator on the vial is then moved to position number two so that the upper ports of the inner tube and tool bar are in register. The desired amount of plasma is withdrawn from the inner tube by a syringe or the like. It should be noted that if all of the plasma is drawn off, 5 ml of concentrated platelets will remain in the tube. The remaining blood in the vial is then gently agitated and with the tube actuator in its first position, the remaining platelet concentrate is extracted from the vial with a 20 ml syringe.

A modified form of the assembly is also shown and described.

Although the above-described procedure refers to a single vial being prepared, centrifuged, etc., a pair of vials would normally be utilized to balance the centrifuge.

It is therefore a principal object of the invention to provide an improved centrifuge tube assembly and the method of using the same.

A further object of the invention is to provide a device of the type described wherein the aspiration tube thereof draws blood parallel to the layers of separation which preserves the integrity of the layers and allows for faster component aspiration.

A further object of the invention is to provide a device of the type described which includes a single port which is of the self-sealing design to greatly reduce the risk of accidental contamination and which may be easily swabbed with alcohol.

Still another object of the invention is to provide a tube actuator which may be positioned with the thumb and forefinger.

Yet another object of the invention is to provide a device wherein the clinician has complete control over the concentration and volume of the end product.

Still another object of the invention is to provide a centrifuge tube assembly which has the same dimensions as a standard 50 ml centrifuge tube and can be used within any centrifuge machine capable of at least 3000 rpms.

A further object of the invention is to provide a centrifuge tube assembly of the type described which provides the most cost effective solution specifically designed for the concentration of platelets.

A further object of the invention is to provide a centrifuge tube assembly wherein the aspiration tube thereof is supported in such a manner so as to reduce the possibility of resonance and vibration thereof during the centrifugation process.

These and other objects will be obvious to those skilled in the art.

DETAILED DESCRIPTION OF THE INVENTION

Figure 1:
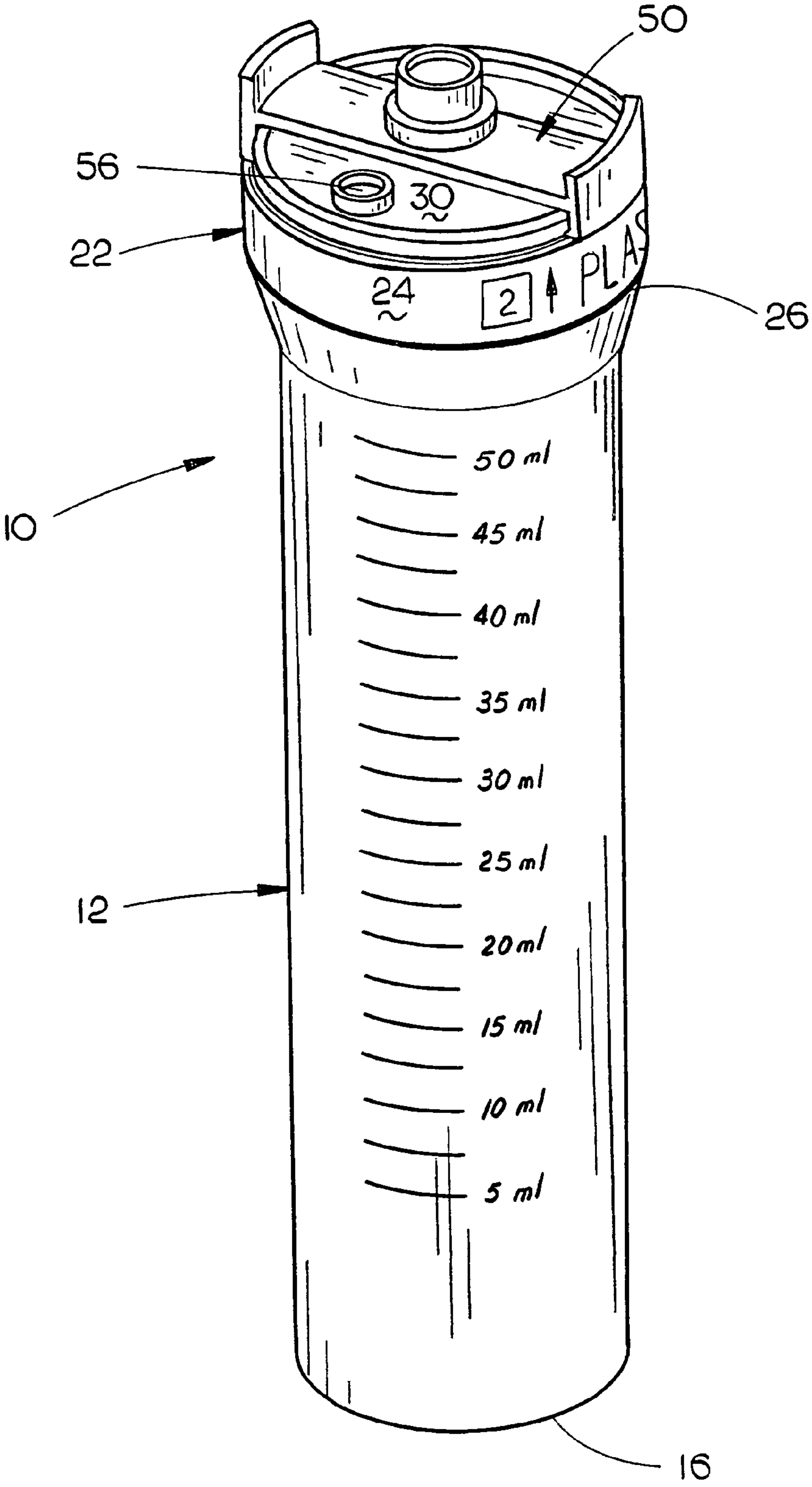
FIG. 1 is perspective view of the device of this invention.

With respect to FIGS. 1, 2, 3A, 3B and 3C, the numeral 10 refers generally to the centrifuge tube assembly of this invention which will be referred to hereinafter as "assembly". Assembly 10 includes an elongated vial 12 having an open upper end 14 and a lower end 16. The numeral 18 refers to a bottom wall which is positioned within the vial 12 above the lower end thereof and which may be integrally molded with the vial 12 or separately formed and inserted into the lower end of the vial 12 and secured thereto in position by any convenient means. Bottom wall 18 defines an inverted, truncated conical-shaped configuration which has a centrally disposed tubular portion 20.

The numeral 22 refers to a lid or cover which is snap-fitted onto the upper end of the vial 12. Lid 22 includes a skirt portion 24 which embraces the upper end of the vial 12 with the lower end of the skirt portion 24 engaging the annular flange 26 which extends outwardly from the outer surface of the vial 12. Lid 22 also includes a centrally disposed hollow tubular portion 28 which extends downwardly from the top wall 30 of lid 22. Lid 22 also includes a ring 31 which extends upwardly from top wall 30.

The numeral 32 refers to a bottom tube having an upper end 34 and a lower end 36. The lower end 36 of bottom tube 32 is snap-fitted into the centrally disposed tubular portion 20 of bottom wall 18, as illustrated in the drawings. Bottom tube 32 is provided with a lower port 38 formed in the side wall thereof which is positioned just above the upper end of the centrally disposed tubular portion 20 of bottom wall 18. Bottom tube 32 is also provided with an upper port 40 formed in the side wall thereof below the upper end thereof and which is radially offset with respect to the lower port 38. An optional liquid guide member or deflector 42 may be secured to the side wall of bottom tube 32 below upper port 40 and which extends upwardly and outwardly therefrom, as illustrated in the drawings.

Figure 3A:
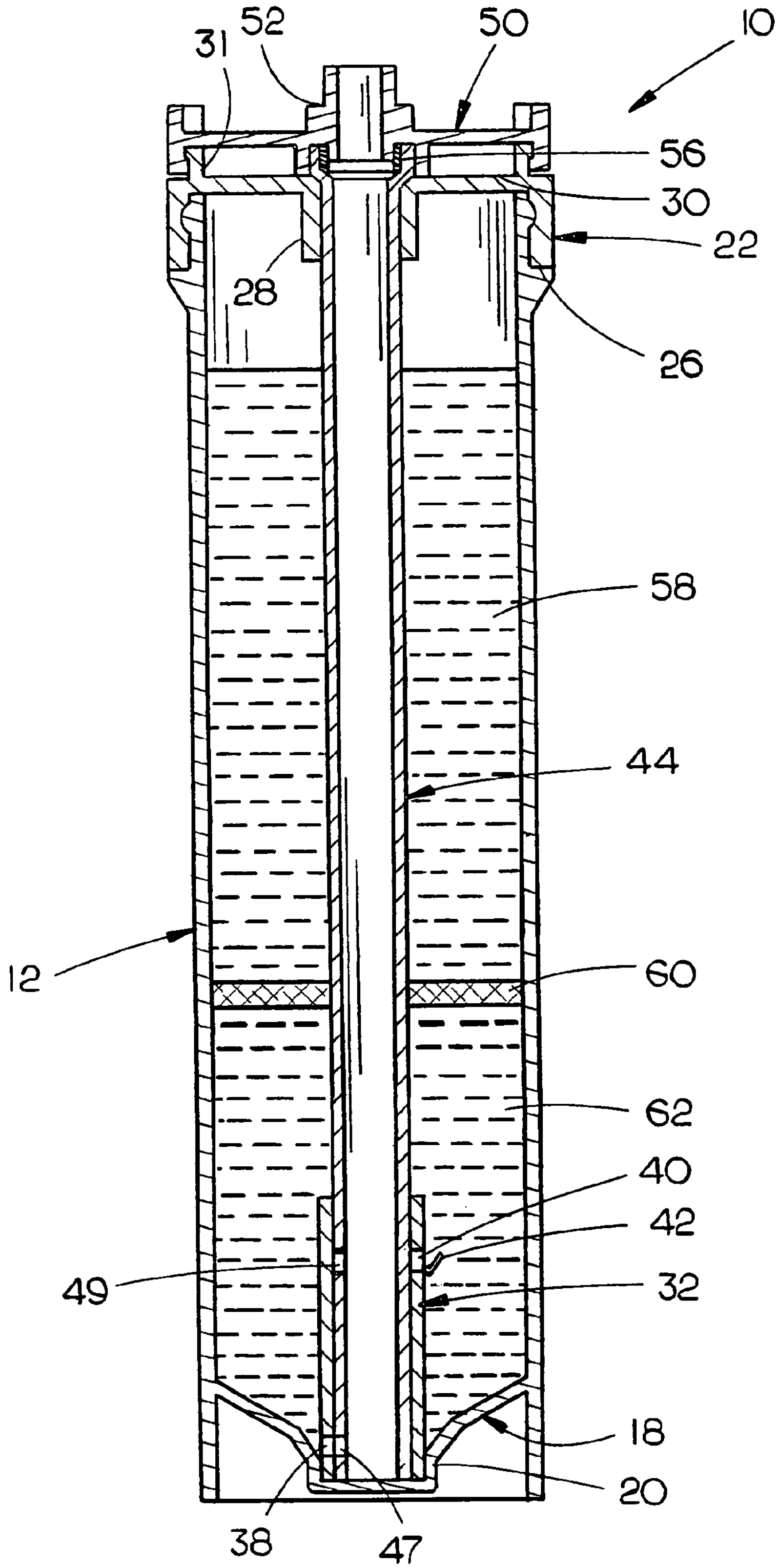
FIGS. 3A, 3B and 3C are sectional views of the device which illustrate the sequence of using the device.

The numeral 44 refers to an elongated inner tube having a lower end 46 and an open upper end 48. Tube 44 has a lower port 47 formed therein above the lower end thereof which may be moved into register with the lower port 38 of bottom tube 32. The inner tube 44 also has an upper port 49 formed therein above lower port 47 which may be brought into register with the upper port 40 of bottom tube 32. The upper end of inner tube 44 is rotatably received by the centrally disposed tubular portion 28 of lid 22 in a sealing relationship. A tube actuator 50 is rotatably mounted on ring 31 on the upper end of lid 22 and includes an upstanding centrally disposed tubular portion 52 which communicates with the open upper end of the inner tube 44 in a sealed relationship with respect thereto so that as fluid is withdrawn from the upper end of the tube 44, the fluid will not escape from any place other than the open upper end of the tubular portion 52 of tube actuator 50. Preferably, a seal 56 is provided between the upper end of the inner tube 44 and the tube actuator 50 (FIG. 3A).

Figure 2:
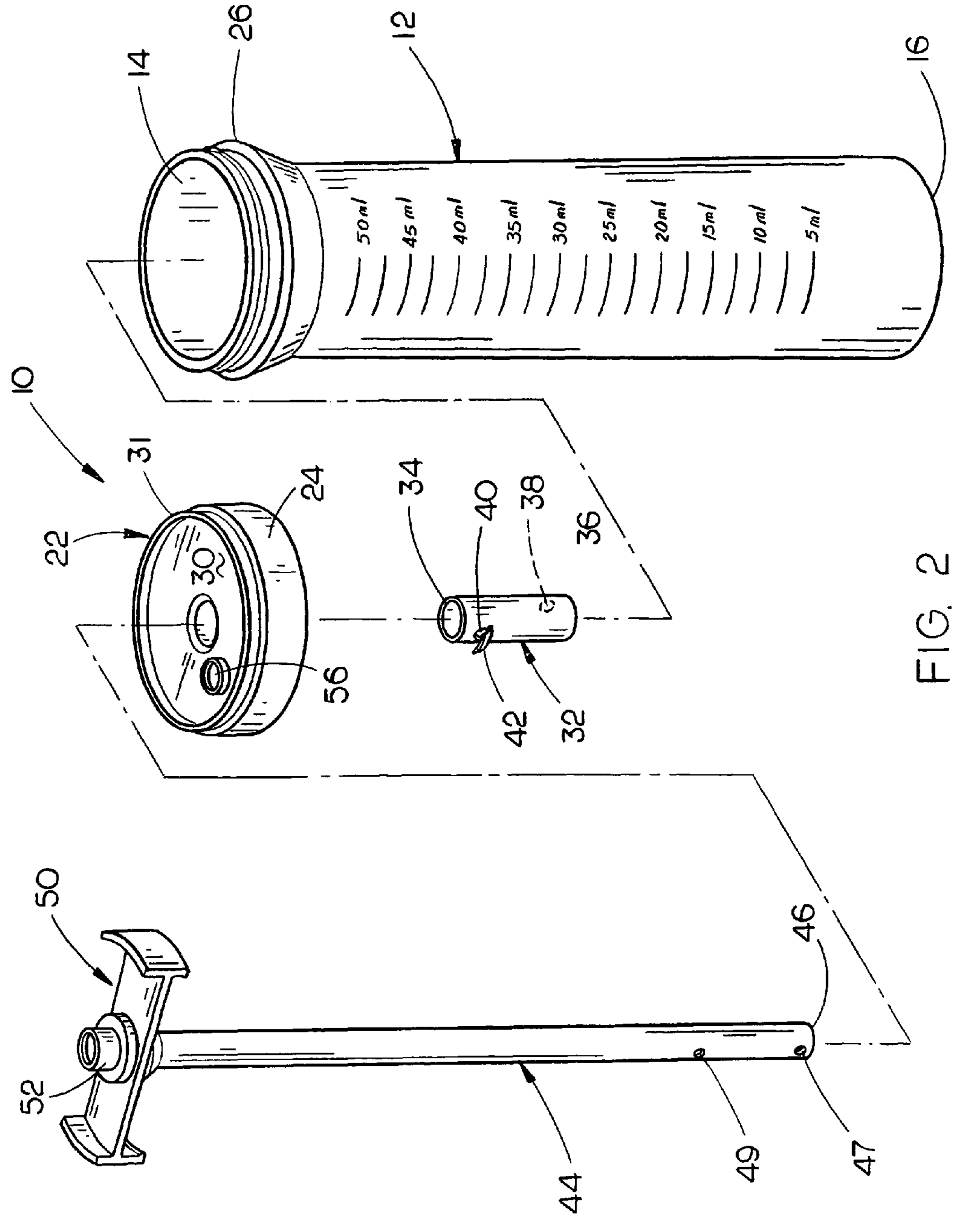
FIG. 2 is an exploded perspective view of the device of this invention.

Preferably, the components of the assembly 10 are formed from a clear polypropylene or polycarbonate material. The vial 12 is designed so that it holds at least 50-60 ml of fluid volume and fits inside a standard or custom non-aerosol container in a centrifuge bucket. The exterior surface of the vial 12 must have volume graduations imprinted on one side thereof in milliliters (FIG. 2). Preferably, lid 22 includes a vent opening 56 which is closed by a suitable material such as Gore-Tex or the like which permits the flow of air therethrough but which prevents the flow of liquids therethrough.

Preferably, the vial 12 is tapered so that the diameter of the lower end thereof is slightly less than the diameter of the upper end thereof. Preferably, the inner tube 44 is also tapered so that its lower end has a diameter which is slightly less than the diameter of the upper end thereof. Although the drawings illustrate that the lower end of the inner tube 44 is positioned within bottom tube 32, the tubes 32 and 44 could be sized so that the lower end of tube 44 rotatably embraces tube 32. The tube 44 is supported by the tube 32 to reduce, if not eliminate, the possibility of resonance and vibration of the tube 44 during the centrifugation process which could disrupt the separation of the layers and prematurely activate the platelets.

The assembly 10 of this invention is utilized as follows. A 60 cc syringe is filled with 5 ml of CPDA. 50 ml of blood is then drawn into the syringe. The syringe is then gently agitated to mix the blood and the CPDA. The tube actuator 50 is then rotated into position one wherein lower port 47 of inner tube 44 registers with lower port 38 of bottom tube 32. In the first position, upper port 49 of inner tube 44 is not in register with upper port 40 in bottom tube 32. With the device in hand, exactly 50 ml of the blood/CPDA mixture is injected into the tube 44 by means of the open upper end of the actuator 50.

The assembly 10 is then placed in a centrifuge and spun at 3300 rpm for eight minutes. The assembly is then removed from the centrifuge and the RBC/plasma interface level is observed. FIG. 3A illustrates the tube actuator in position one and illustrates the various layers within the vial wherein the reference numeral 58 refers to plasma, the numeral 60 refers to the platelets and the numeral 62 refers to the red blood cells. The technician determines the RBC/plasma interface level and mentally subtracts three from the RBC/plasma interface level. With the tube actuator in position number one, a syringe is used to draw the calculated amount of red blood cells from the vial by means of the open upper end of the tubular portion 52 of the actuator 50.

Figures 3B, 3C:
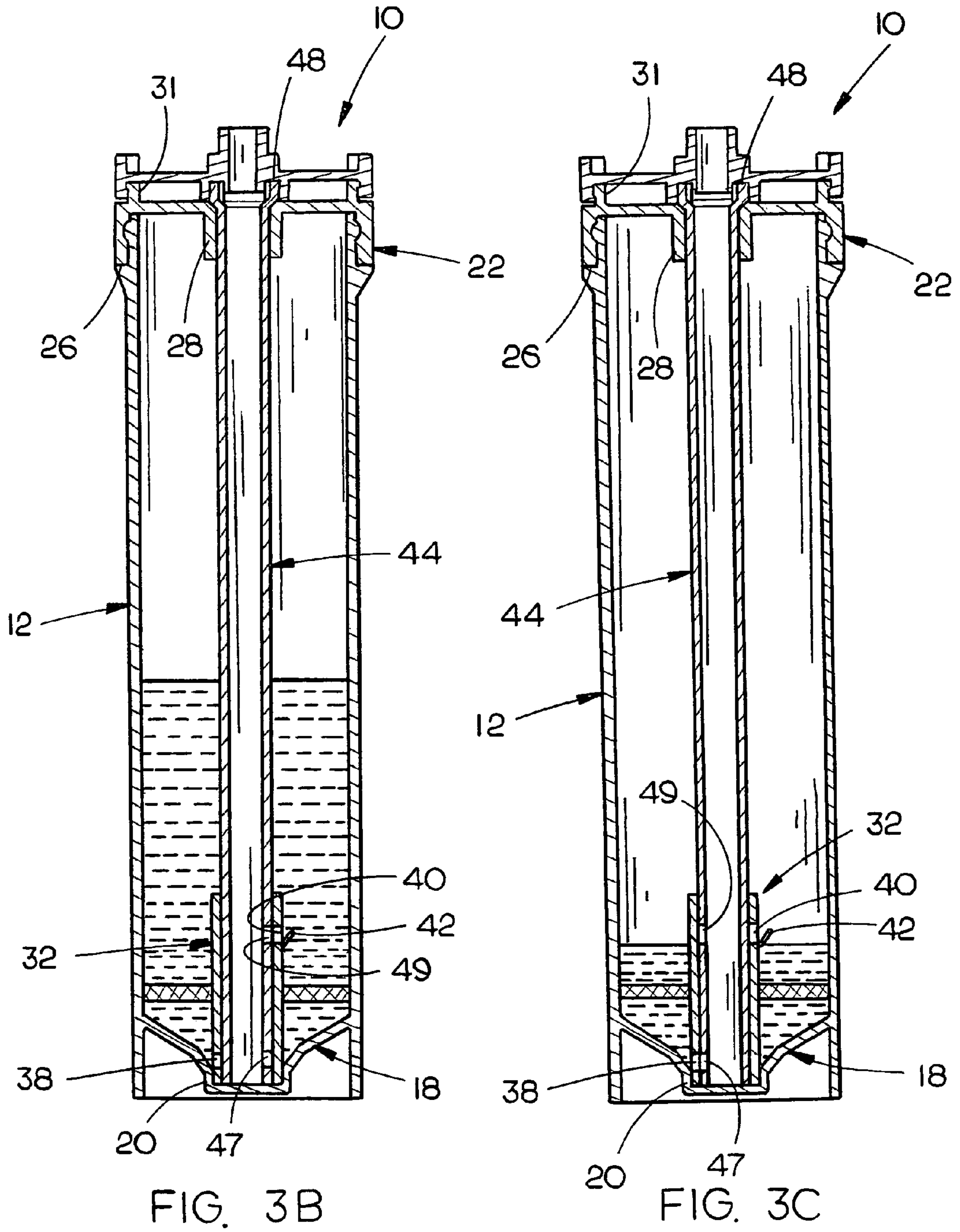
Figure 4:
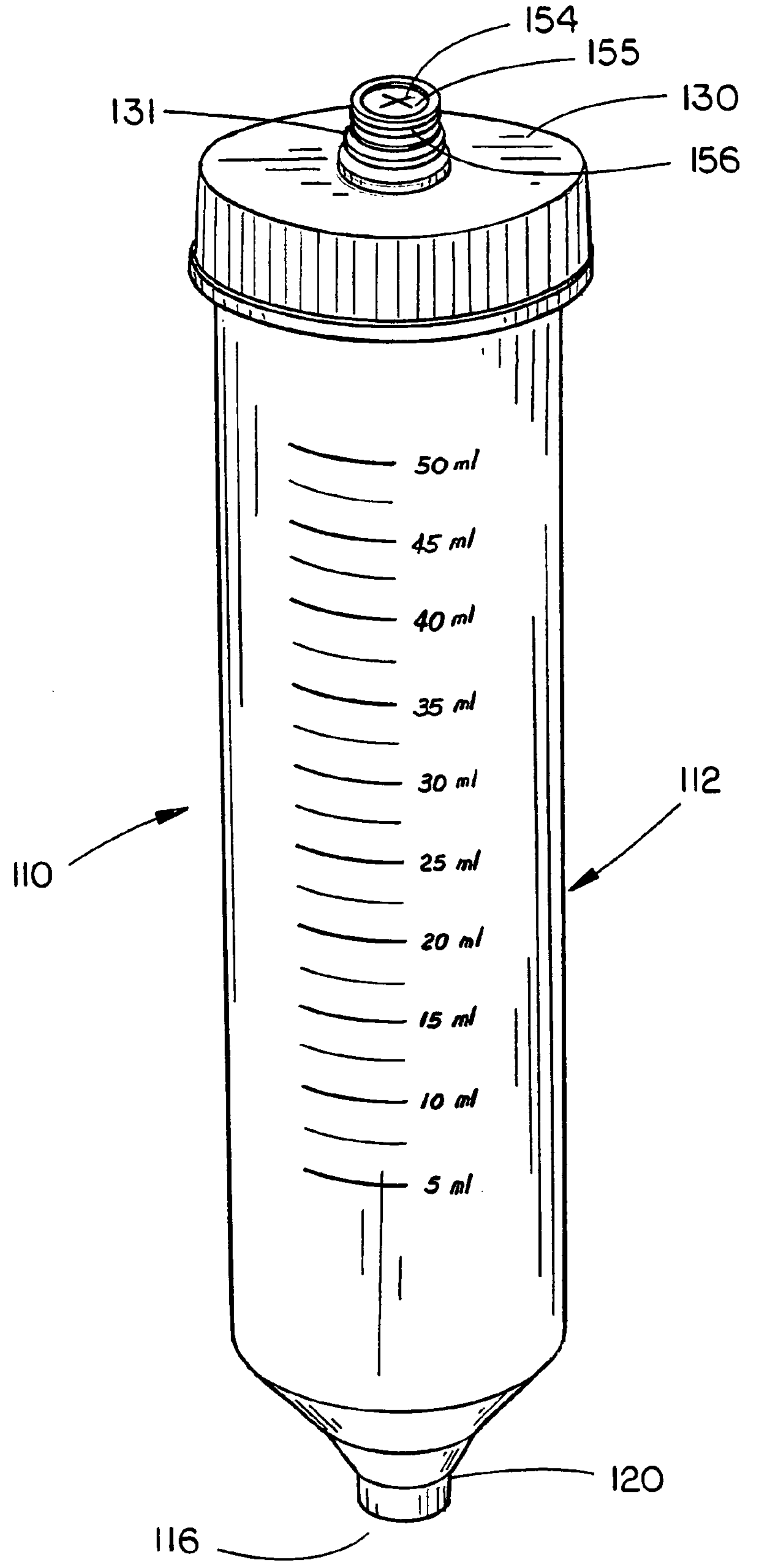
FIG. 4 is perspective view of a modified form of the device of this invention.
Figure 5:
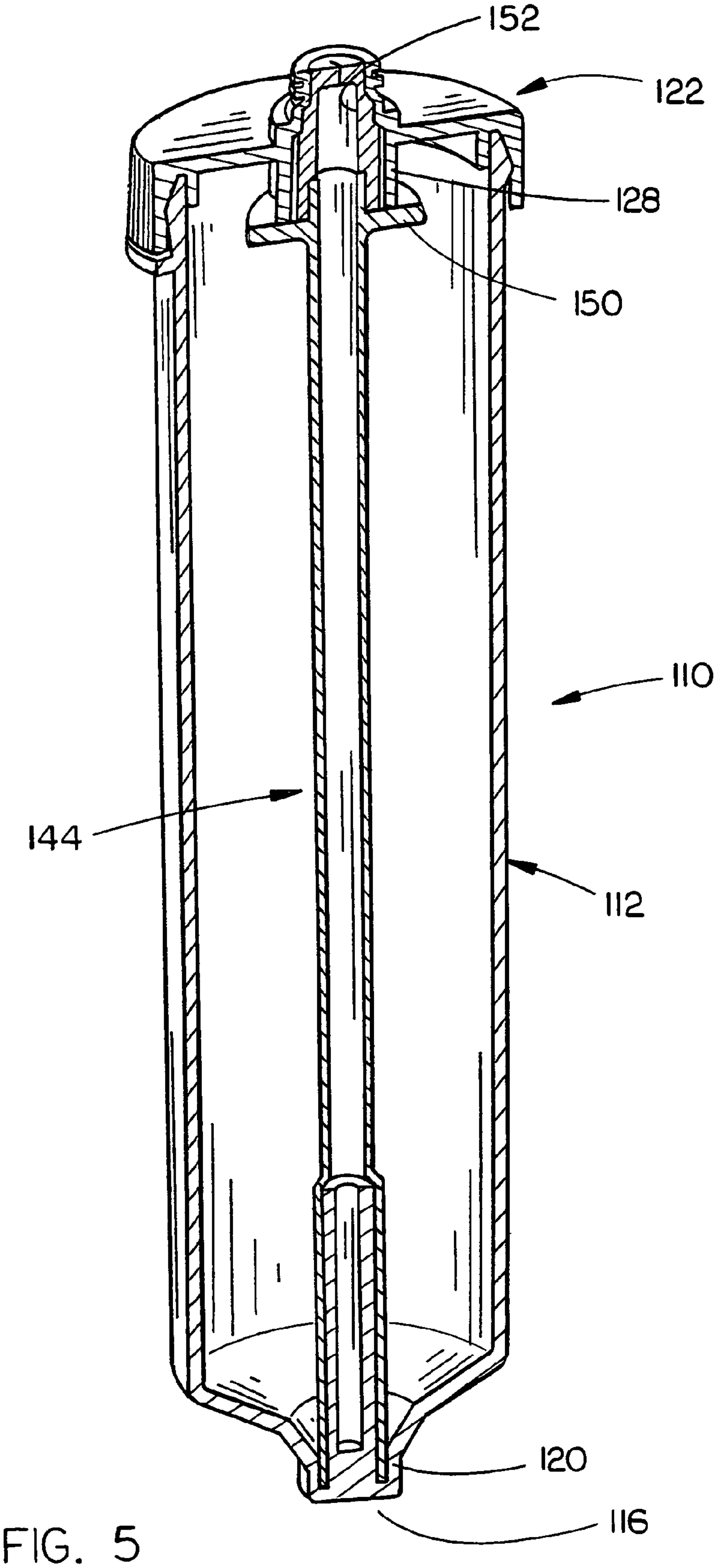
FIG. 5 is a longitudinal sectional view of the device of FIG. 4.
Figure 6:
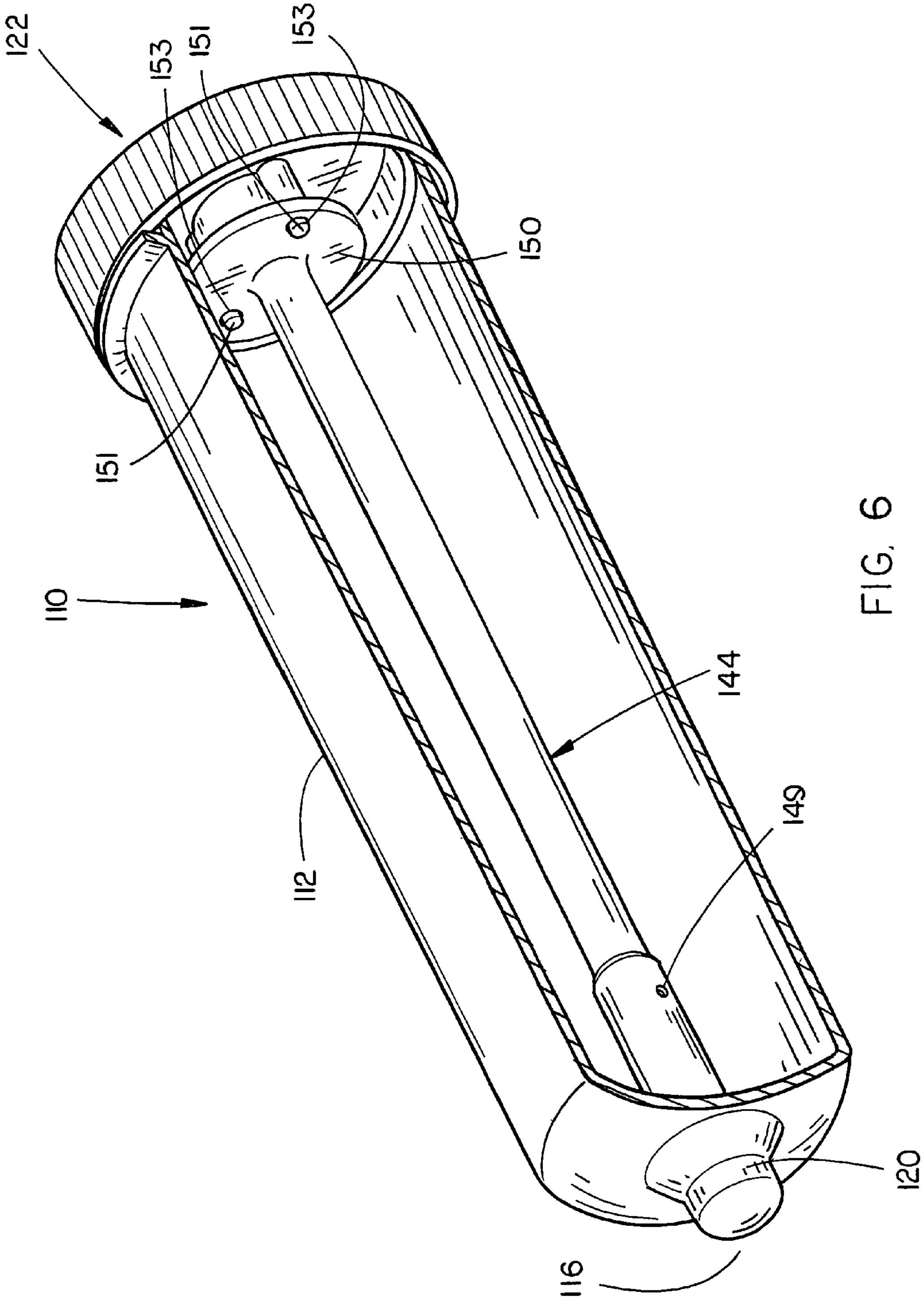
FIG. 6 is a perspective view of the device of FIG. 4 with a portion thereof cut away.

The assembly is then again placed in the centrifuge and spun at 3300 rpm for eight minutes. The assembly is then removed from the centrifuge and with the tube actuator in position number two, wherein the upper port 49 of tube 44 registers with the upper port 40 of bottom tube 32, the desired amount of plasma is withdrawn from the tube 44. FIG. 3B illustrates the various layers prior to the plasma being withdrawn from the vial 12 while FIG. 3C illustrates the various levels after the plasma has been withdrawn. If all of the plasma is withdrawn, approximately 5 ml of concentrated platelets will remain in the tube. The remaining red blood cells, platelets and plasma is gently agitated and with the tube actuator in position number one, the remaining platelet concentration is removed with a 20 ml syringe.

Although the method described above speaks of using a single assembly, two of the assemblies 10 would normally be prepared and placed in the centrifuge to balance the centrifuge.

The aspiration tube assembly of this invention permits blood to be drawn parallel to the layers of separation which preserves the integrity of the layers and allows for faster component aspiration. The single port, self-sealing design of the invention greatly reduces the risk of accidental contamination and may be easily swabbed with alcohol. The tube actuator 50 of this invention may be easily rotated between its various positions with the thumb and forefinger. The assembly of this invention allows the clinician complete control over the concentration and volume of the end products and has the same dimensions as a standard 50 ml centrifuge tube which may be used with any centrifuge machine capable of at least 3000 rpms. The assembly of this invention is believed to provide the most cost effective solution specifically designed for the concentration of platelets. The fact that the lower end of the tube 44 is supported or stabilized by the tube 32 prevents resonance and vibration during the centrifugation process as discussed above.

FIGS. 4-7 illustrate a slight modified form of the invention wherein the assembly is referred to by the reference numeral 110. Assembly 110 includes an elongated vial 112 having an open upper end 114 and a lower end 116 which defines an inverted, truncated conical-shaped configuration which has a centrally disposed tubular portion 120.

The numeral 122 refers to a lid/actuator which is rotatably snap-fitted onto the upper end of the vial 112. Lid/actuator 122 also includes a centrally disposed, hollow, tubular portion 128 which extends downwardly from the top wall 130 of lid 122 and which also includes an upper end portion 131 which extends upwardly from top wall 130.

The numeral 132 refers to a bottom tube having an upper end 34 and a lower end 36. Bottom tube 132 is provided with a lower port 138 formed in the side wall thereof which is positioned just above the upper end of the centrally disposed tubular portion 120. Bottom tube 132 is also provided with an upper port 140 formed in the side wall thereof below the upper end thereof and which is radially offset with respect to the lower port 138.

Figure 7:
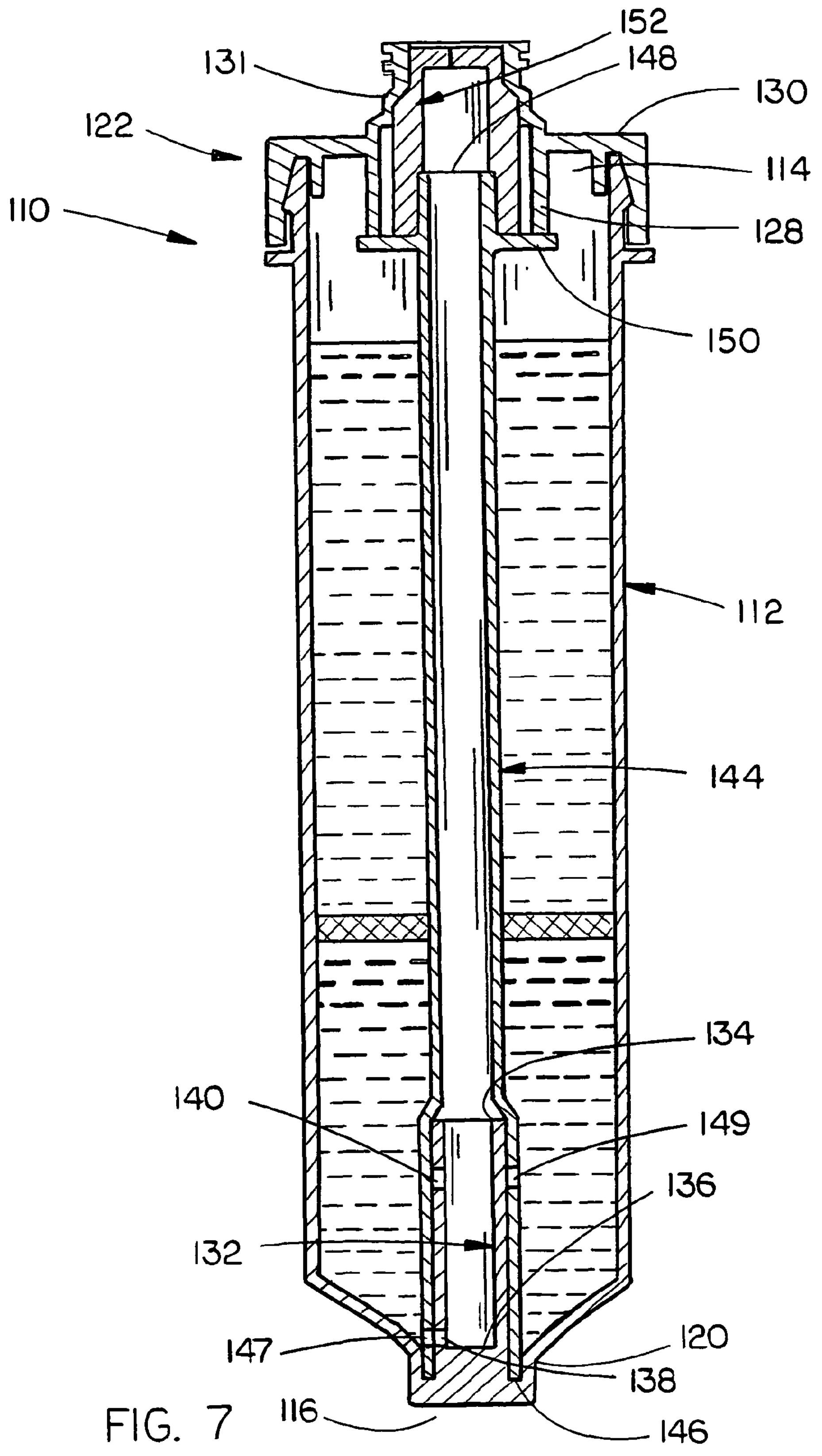
FIG. 7 is a sectional view of the device of FIG. 4 similar to FIG. 3A.

The numeral 144 refers to an elongated tube having a lower end 146 and an open upper end 148. Lower end 146 of tube 144 rotatably embraces bottom tube 132. Tube 144 has a lower port 147 formed therein above the lower end thereof which may be moved into register with the lower port 138 of bottom tube 132. The tube 144 also has an upper port 149 formed therein above lower port 147 which may be brought into register with the upper port 140 of bottom tube 132. The upper end of tube 144 is received by the centrally disposed tubular portion 128 of lid 122 in a sealing relationship (FIG. 7). Tube 144 is provided with an annular flange 150 below its upper end which is secured to tubular portion 128 by the pins 151 extending downwardly from tubular portion 128 which are received by openings 153 formed in flange 150 so that rotation of lid/actuator 122 causes tube 144 to also rotate. A flexible seal 152 is positioned in tubular portion 128 and has intersecting slits 154 and 155 formed in the upper end thereof to seal the upper end thereof while permitting a syringe needle to be inserted therethrough. The exterior portion of the upper end portion 131 is provided with threads 156 to permit a syringe to be threadably secured thereto.

The assembly 110 is substantially identical to assembly 10 except that the tube 144 rotatably embraces bottom tube 132 and the lid also acts as a tube actuator. The assembly 110 is utilized in an identical fashion to that described above with respect to assembly 10.

Thus it can be seen that the invention accomplishes at least all of its stated objectives.

I claim:

1. A centrifuge tube assembly, comprising: a centrifuge and a centrifuge tube, said centrifuge tube comprising:

an elongated vial having an open upper end and a closed lower end; a lid mounted on said open upper end of said vial; said lid having a central opening formed therein;

said vial having a centrally disposed hollow bottom tube, having upper and lower ends, extending upwardly from the lower end thereof; said hollow bottom tube having a single lower port and a single upper port formed therein which are radially offset with respect to one another; an inner tube, having upper and lower ends; said inner tube positioned within said vial so as to rotatably extend through said central opening in said lid; said lower end of said inner tube being rotatably received by said bottom tube; said inner tube having a single lower port and a single upper port formed therein; said single lower port of said inner tube being spaced directly below said single upper port; said inner tube being selectively rotatable between first and second positions with respect to said bottom tube; said lower port of said inner tube registering with said lower port of said bottom tube when said inner tube is in its said first position; said upper ports of said bottom tube and said inner tube not being in register when said inner tube is in its said first position; said upper port of said inner tube being in register with said upper port of said bottom tube when said inner tube is in its said second position; said lower port of said inner tube not being in register with said lower port of said bottom tube when said inner tube is in its said second position.

2. The centrifuge tube assembly of claim 1 wherein a tube actuator is secured to said upper end of said inner tube so that said inner tube may be selectively rotated with respect to said vial to its said first and second positions.

3. The centrifuge tube assembly of claim 2 wherein said tube actuator is secured to said upper end of said inner tube above said lid.

4. The centrifuge tube assembly of claim 3 wherein said tube actuator includes a centrally disposed hollow tubular member which fluidly communicates with said upper end of said inner tube.

5. The centrifuge tube assembly of claim 4 wherein said tubular member of said tube actuator is sealed to said upper end of said inner tube.

6. The centrifuge tube assembly of claim 1 wherein said lid is rotatably sealed to said upper end of inner tube at said central opening in said lid.

7. The centrifuge tube assembly of claim 1 wherein said vial includes a generally truncated conical-shaped bottom wall.

8. The centrifuge tube assembly of claim 7 wherein said bottom wall includes a central tubular portion which is adapted to rotatably receive said lower end of said inner tube.

9. The centrifuge tube assembly of claim 8 wherein said lower end of said bottom tube is snap-fitted into said central tubular portion of said bottom wall.

10. The centrifuge tube assembly of claim 9 wherein said lower port of said bottom tube is positioned above said central tubular portion of said bottom wall.

11. The centrifuge tube assembly of claim 1 wherein said bottom tube has a liquid guide member positioned adjacent said upper port thereof.

12. The centrifuge tube assembly of claim 11 wherein said liquid guide member is positioned adjacent said upper port of said bottom wall member at the lower end thereof.

13. The centrifuge tube assembly of claim 1 wherein said lid has a vent opening formed therein.

14. The centrifuge tube assembly of claim 13 wherein said vent opening permits air to pass therethrough while preventing the flow of liquid therethrough.

15. The centrifuge tube assembly of claim 1 wherein said inner tube is tapered so that the lower end thereof has a smaller diameter than the diameter of the upper end thereof.

16. The centrifuge tube assembly of claim 15 wherein said vial is tapered so that the lower end thereof has a smaller diameter than the diameter of the upper end thereof.

17. A centrifuge tube assembly, comprising: a centrifuge and a centrifuge tube, said centrifuge tube comprising: an elongated vial having an open upper end and a closed lower end; a lid/actuator rotatably mounted on said open upper end of said vial; said lid having a central opening formed therein; said vial having a centrally disposed hollow first tube, having upper and lower ends, extending upwardly from the lower end thereof; said hollow first tube having a single upper port and a single lower port formed therein; said lower port of said first tube being spaced directly below said upper port of said first tube; a hollow second tube, having upper and lower ends; said upper end of said second tube being secured to said lid/actuator for rotation therewith; said lower end of said second tube rotatably embracing said first tube; said second tube having a single upper port and a single lower port formed therein; said lower and upper ports of said second tube being radially offset with respect to one another; said second tube being selectively rotatable with said lid/actuator between first and second positions with respect to said first tube; said lower port of said second tube registering, with said lower port of said first tube when said second tube is in its said first position; said upper ports of said first tube and said second tube not being in register when said second tube is in its said first position; said upper port of said second tube being in register with said upper port of said first tube when said second tube is in its said second position; said lower port of said second tube not being in register with said lower port of said first tube when said second tube is in its said second position.

18. The centrifuge tube assembly of claim 17 wherein said lid/actuator includes a centrally disposed hollow tubular member which fluidly communicates with said upper end of said second tube.

19. The centrifuge tube assembly of claim 18 wherein said tubular member of said lid/actuator is sealed to said upper end of said second tube.

20. The centrifuge tube assembly of claim 17 wherein said lid/actuator is sealed to said upper end of second tube at said central opening in said lid/actuator.

21. The centrifuge tube assembly of claim 18 wherein a seal, having upper and lower ends, is positioned in said centrally disposed hollow tubular member, said lower end of said seal embracing said upper end of said second tube.

22. The centrifuge tube assembly of claim 21 wherein said upper end of said seal is yieldably sealed by intersecting slits formed therein.

23. The centrifuge tube assembly of claim 21 wherein said centrally disposed hollow tubular member has external threads provided thereon.

* * * * *